US009586516B2

(12) United States Patent
Hall (10) Patent No.: US 9,586,516 B2
(45) Date of Patent: Mar. 7, 2017

(54) HEADLIGHT LEVEL CONTROL WITH RESIDENTIAL DETECTION MODE (71) Applicant: Gentex Corporation, Zeeland, MI (US)

(72) Inventor: Philip B. Hall, Hudsonville, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 14/632,493

(22) Filed: Feb. 26, 2015

(65) Prior Publication Data
US 2015/0246634 A1 Sep. 3, 2015

Related U.S. Application Data (60) Provisional application No. 61/945,912, filed on Feb. 28, 2014.

(51) Int. Cl.
B60Q 1/00 (2006.01)
F21V 29/90 (2015.01)
B60Q 1/14 (2006.01)
H05B 37/02 (2006.01)

(52) U.S. Cl.
CPC ......... B60Q 1/143 (2013.01); H05B 37/0218 (2013.01); H05B 37/0227 (2013.01); B60Q 2300/112 (2013.01); B60Q 2300/144 (2013.01); B60Q 2300/314 (2013.01); B60Q 2300/3321 (2013.01); B60Q 2300/41 (2013.01); B60Q 2300/42 (2013.01); Y02B 20/46 (2013.01)

(58) Field of Classification Search
CPC ........ B60Q 1/00; B60Q 1/14; B60Q 2300/41; B60Q 2300/42; B60Q 2300/312; B60Q 1/44; B60Q 2400/30; F21V 23/0442; F21V 23/0464; F21V 23/0471; F21V 29/90
USPC ......... 362/460, 464–466, 37; 315/79, 82, 77
See application file for complete search history.

(56) References Cited

U.S. PATENT DOCUMENTS

| 7,613,327 | B2 | 11/2009 | Stam et al. | |
| 8,045,760 | B2 | 10/2011 | Stam et al. | |
| 2009/0010494 | A1* | 1/2009 | Bechtel | B60Q 1/1423 382/104 |
| 2009/0231867 | A1* | 9/2009 | Mochizuki | B60Q 1/143 362/466 |
| 2014/0084788 | A1* | 3/2014 | Kim | B60Q 1/143 315/79 |

(Continued)

Primary Examiner — Douglas W Owens
Assistant Examiner — Wei Chan
(74) Attorney, Agent, or Firm — Price Heneveld LLP; Bradley D. Johnson (57) ABSTRACT The disclosure provides for an automatic vehicle exterior light control system including an optical sensor and a processor. The processor is in communication with the optical sensor and a speed sensor. A light control subroutine may be activated in response to a control signal output by the processor in response to a plurality of conditions. The subroutine is activated in response determining that the speed of the vehicle is maintained between a first speed and a second speed and a detection of an external light from an external light source detected by the optical sensor. Once the light control subroutine is activated, the processor changes the light level of the light source from the first level to a second light level and maintains the second light level until the processor detects the vehicle speed exceeding a third speed.

19 Claims, 4 Drawing Sheets (56) References Cited

U.S. PATENT DOCUMENTS

2014/0169010 A1* 6/2014 Imaeda ............... B60Q 1/143
362/460

* cited by examiner

HEADLIGHT LEVEL CONTROL WITH RESIDENTIAL DETECTION MODE

CROSS-REFERENCE TO RELATED APPLICATION

This application claims priority to and the benefit under 35 U.S.C. §119(e) of U.S. Provisional Patent Application No. 61/945,912, filed Feb. 28, 2014, entitled HEADLIGHT LEVEL CONTROL WITH RESIDENTIAL DETECTION MODE.

BACKGROUND

The present disclosure generally relates to a vehicle control system for automatic control of various vehicle equipment systems. The present invention provides a vehicle control system with improved features to detect lighting environments and automatic response to detected lighting environments.

SUMMARY

One aspect of the present disclosure includes an automatic vehicle exterior light control system including an optical sensor and a processor. The processor is in communication with the optical sensor and a speed sensor. The processor is configured to output a control signal configure to control a light level of at least one light source of a controlled vehicle as a function of a speed of the vehicle. The processor is further configured to detect and monitor the speed of the vehicle by monitoring a speed signal communicated from the speed sensor. In response to the detecting the vehicle speed exceeding a first threshold, the processor may output the control signal which may activate a first level of the light source.

The control signal is configured to control the light source in a light control subroutine. The light control subroutine may be activated by the processor in response to a plurality of conditions. The control signal may be output from the processor to activate the light control subroutine in response to the speed of the vehicle being maintained between a second threshold and a third threshold and a detection of an external light from an external light source detected by the optical sensor. Once the light control subroutine is activated, the control signal may output the control signal to attempt to adjust the light level of the light source from the first level to a second light level. The second light level may be maintained until the processor detects the vehicle speed exceeding a fourth threshold.

These and other features, advantages, and objects of the present device will be further understood and appreciated by those skilled in the art upon studying the following specification, claims, and appended drawings.

DETAILED DESCRIPTION

Figure 1:
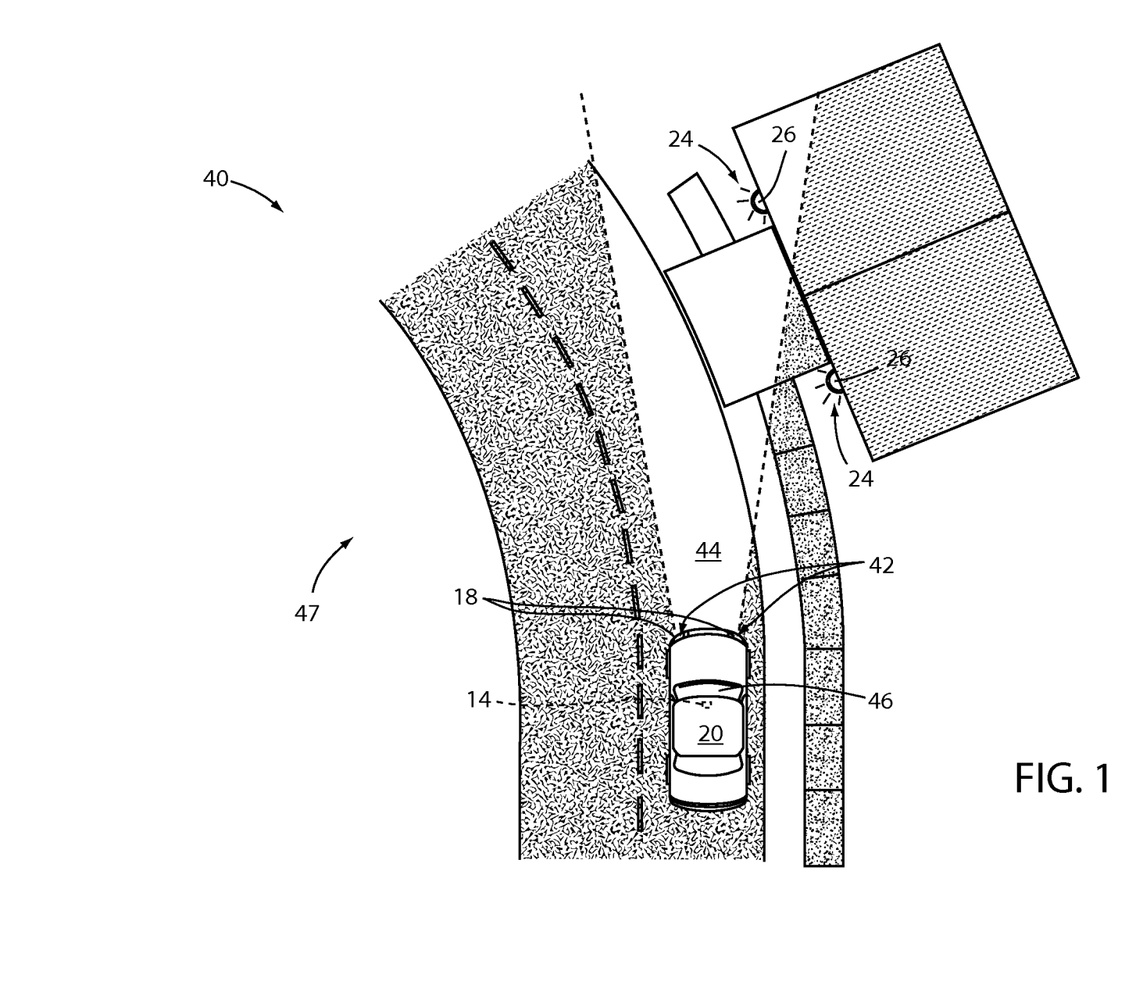
FIG. 1 is an environmental view of a vehicle having a headlight level control system with a residential detection mode.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms first, second, third, etc. as utilized herein may provide designations in reference to the figures for clarity. For example, a first component and a second component may be referred to in some implementations. However, the terms first component and second component may be used to broadly describe components that may be interchanged in reference to various implementations including those referred to in the claims. Such designations may serve to demonstrate exemplary arrangements and compositions and should not be considered to designate a specific number of elements, an order of elements, or essential components of any specific implementation of the disclosure, unless clearly specified otherwise. These designations, therefore, should be considered to provide clarity in reference to various possible implementations of the disclosure, which may be combined in various combinations and/or individually utilized to clearly reference various elements of the disclosure.

Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some state other than a low beam state). If a vehicle was present in the glare area, the controller would respond by changing the state of the exterior lights so as to not cause glare for the other driver(s). Examples of such systems are described in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, the entire disclosures of which are incorporated herein by reference.

In some of the prior systems, the controller would analyze the captured images, to detect whether the vehicle was in or entering a village or residential area. The controller would then typically either place the exterior lights in a low beam state or otherwise inhibit operation of high beam headlamps. Examples of such systems are described in U.S. Pat. Nos. 6,861,809, 7,565,006, and 8,045,760, the entire disclosures of which are incorporated herein by reference.

The present disclosure provides various advantages by activating a light control subroutine is in response to the controller determining that the speed of the vehicle is maintained between a first speed and a second speed, and additionally detecting a light source. Once activated, the light control subroutine may inhibit the activation of high beam headlamps until the vehicle exceed a third speed. The light source may correspond to any light source, for example a stable light source having a very high frequency flicker or no reasonably detectable flicker that may be similar to a direct current (DC) light source. It should be appreciated that the present invention is not limited to the specific manner by which a vehicle manufacturer chooses to respond to the indication residential area; however, by providing this information, system allows vehicle manufacturers flexibility in how they choose to have an exterior light control respond in the different types of operating conditions.

Figure 2:
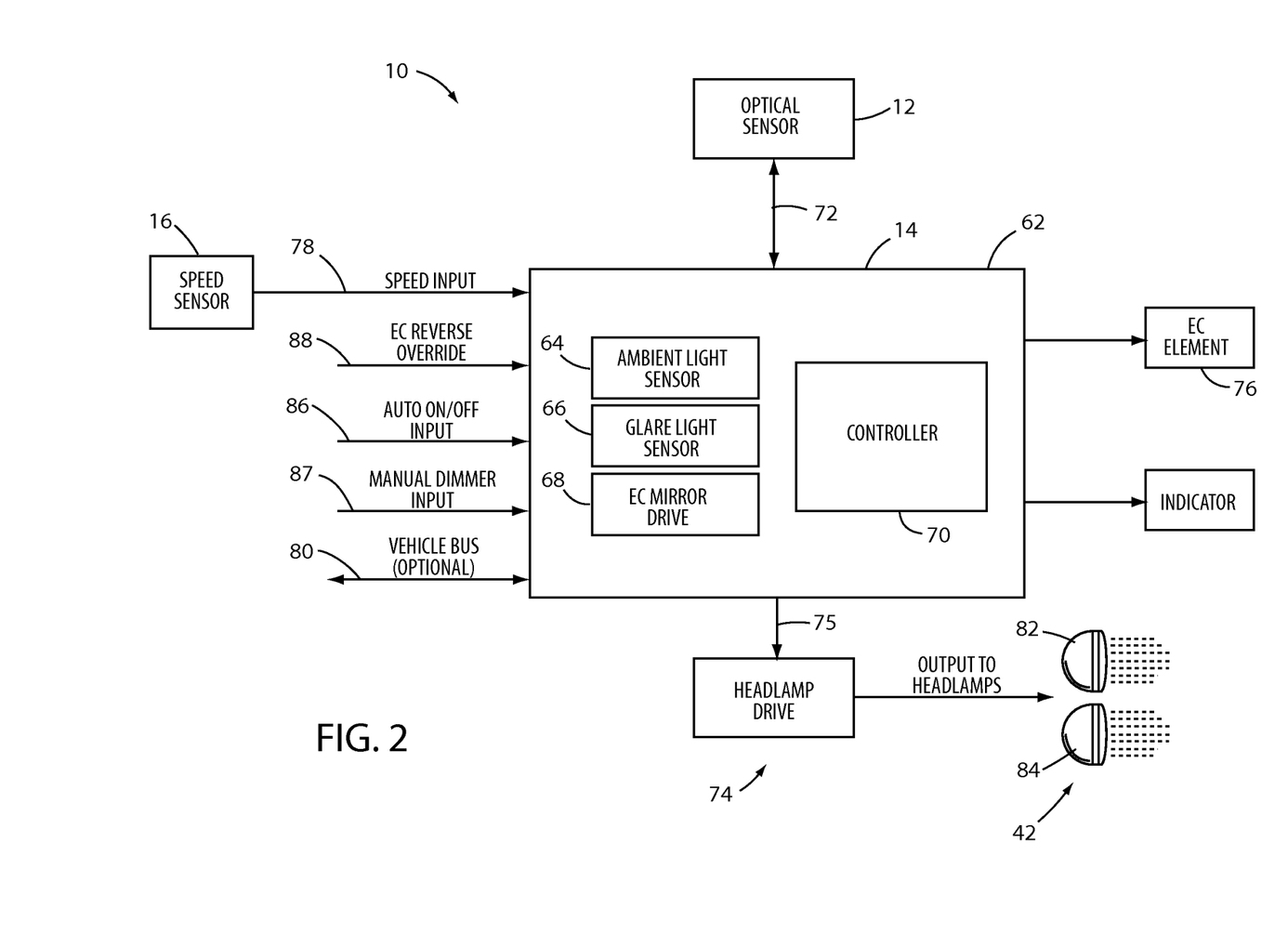
FIG. 2 is a block diagram of an exemplary system configured to control the headlights of a vehicle.

Referring to FIGS. 1 and 2, an automatic vehicle exterior light control system 10 is shown including an optical sensor 12 and a controller 14 or processor. The controller 14 is in communication with the optical sensor 12 and a speed sensor 16. The controller 14 is configured to control a lighting level of at least one light source 18 of a controlled vehicle 20 as a function of a speed of the vehicle 20. The controller 14 is further configured to detect and monitor the speed of the vehicle by monitoring a speed signal communicated from the speed sensor 16 and activate a first level of the light source 18. A light control subroutine is activated by the controller 14 in response to a plurality of conditions. The light control subroutine is activated in response to the controller 14 determining that the speed of the vehicle 20 is maintained between a first speed and a second speed and a detection of an external light 24 from an external light source 26 is detected by the optical sensor 12. Once the light control subroutine is activated, the controller 14 changes the light level of the light source 18 from the first light level to a second light level and maintains the second light level until the controller detects the speed of the vehicle 20 exceeding a third speed.

The methods and systems that are detailed in this disclosure provide for a light level control configured to control a light level of an exterior vehicle light in response to an external light detection, and further configured to provide for various methods of light level control to ensure that a change in a light level does not distract a vehicle operator. The methods and systems are operable to identify conditions when exterior light sources may not originate from other vehicles to limit intermittent and distracting light level changes of the exterior vehicle lights. The methods and systems discussed herein provide for improved reliability and accuracy in automatic headlight level control which will further improve the comfort and safety of passengers of vehicles implementing such methods and systems.

Referring to FIG. 1 an operating environment 40 for the vehicle 20 having an automatic vehicle exterior light control system 10 is shown in accordance with the disclosure. The vehicle exterior light control system 10 includes an optical sensor 12 for detecting an external light source 26 in response to light 24 being detected by the optical sensor 12. The system 10 is configured to automatically control a light level of a light source 18, for example the headlights 42, of the vehicle 20. The light level is partially controlled by the system 10 by monitoring the speed of the vehicle 20 and detecting light sources corresponding other vehicles with the optical sensor 12. The headlights 42 of the vehicle 20 are controlled automatically to avoid shining the high beams, or bright lights, directly into the eyes of drivers of oncoming vehicles.

The optical sensor 12 is configured to have a forward facing field of view 44 and in some examples is mounted high on a windshield 46 of the vehicle 20 to provide a clear forward view. In at least one implementation, the optical sensor 12 may be mounted in a rearview mirror mount, a vehicle headliner, a visor, or in an overhead console. Other views that may be advantageously employed include mounting the optical sensor 12 on an A-pilar, a dashboard, or at any other location providing a forward viewing area. Though specific examples of mounting locations for the optical sensor 12 are discussed herein, the optical sensor 12 may be mounted or located in a variety of locations to achieve the forward facing field of view 44 within the spirit of the disclosure.

During operation, the system 10 receives images from the optical sensor 12 and processes the images to detect external light sources that may correspond to other the headlights and/or taillights of other vehicles or other external light sources (e.g. external light sources 26). Under certain conditions, the optical sensor 12 of the system 10 may detect external light sources 26 that may appear in the field of view 44 similar to a light source originating from another vehicle. In some cases the external light source 26 may be detected approximately central to the field of view 44 of the optical sensor 12. In some cases, the external light source may also be appear anywhere in the field of view 44. A light source may correspond to any light source that may be stable having a very high frequency flicker or no reasonably detectable flicker that may be similar to a direct current (DC) light source.

When the external light source 26 is detected in the field of view 44, the system 10 may process the light 24 detected in images of the external light sources 26 captured by the optical sensor 12 and respond by dimming the light level of the headlights 42. Repeated dimming and brightening between light levels of the headlights 42 may cause distractions resulting from the headlights 42 changing from the first level to the second level intermittently. Such fluctuations in the light level are controlled by the system 10 by limiting the changing of the light level of the headlights 42 in response to the external light source 26 being detected within a range of speeds at which the vehicle 20 is travelling.

In the example shown in FIG. 1, the vehicle 20 is approaching a curve 47 and at least one of the external light sources 26 is shown the field of view 44 of the optical sensor 12. Commonly in circumstances similar to those illustrated, a vehicle is located in a residential, business, or similarly situated area. The system 10 disclosed herein provides various benefits including, but not limited to: limiting false detections of external light sources as corresponding to other vehicles, maintaining the headlights 42 at a lower light level in residential areas, and maintaining safe and consistent operation of an automatic dimming function of the headlights 42.

Referring now to FIG. 2, a detailed schematic view of the system 10 is shown in accordance with the disclosure. The system 10 shown herein has broad functionality that may be used in combination with a variety of different vehicle control systems and is discussed herein to illustrate an exemplary implementation of the system 10. It will be understood to those skilled in the art that one or more of the functions of the system 10 are provided in addition to those required to implement the system 10 with residential control in accordance with the disclosure.

The system 10 may include a main circuit 62, an ambient light sensor 64, a glare light sensor 66, and an electrochromic (EC) mirror drive 68 each of which are in communication with a microcontroller 70. The optical sensor 12 is in electrical communication with the main circuit 62 through a communication line 72 and is mounted in the vehicle 20. The microcontroller 70 is operable to receive image signals from the optical sensor 12. The microcontroller 70 is configured to process the images received from the optical sensor 12, and generate output signals to control the various systems in communication with the microcontroller 70 including a headlamp drive 74 via an output 75.

The microcontroller 70 may be configured to directly connect to the equipment being controlled (e.g. the headlamp drive 74) such that the generated control signals directly control the equipment. Alternatively, microcontroller 70 may be configured to connect to an equipment control, which, in turn, is connected to the equipment being controlled such that the control signals generated by microcontroller 70 only indirectly control the equipment. For example, in the case of the equipment being the headlights 42, the microcontroller 70 may analyze the image data from the optical sensor 12 so as to generate control signals that are more of a recommendation for the headlamp drive 74 to use when controlling the headlights 42. The microcontroller 70 signals may further include not just a recommendation, but also a code representing a reason for the recommendation so that the headlamp drive 74 may determine whether or not to override a recommendation.

In implementations that include an electrochromic (EC) mirror, the circuitry for the electrochromic mirror may also be controlled by the microcontroller 70 of the main circuit 62. The microcontroller 70 includes a plurality of inputs to receive signals from the ambient light sensor 64 and glare lights sensor 66. The microcontroller 70 is further in communication with an electrochromic mirror element 76 and is configured to determine and control an appropriate state for an electrochromic mirror element 76. The mirror is driven by an EC mirror drive circuitry 68, which may be similar to a drive circuit described in U.S. Pat. No. 5,956,012, entitled SERIES DRIVE CIRCUIT, filed by Robert R. Turnbull et al. on Apr. 2, 1997; PCT Application No. PCT/US97/16946, entitled INDIVIDUAL MIRROR CONTROL SYSTEM, filed by Robert C. Knapp et al. on Sep. 16, 1997; and U.S. Pat. No. 6,402,328, entitled AUTOMATIC DIMMING MIRROR USING SEMICONDUCTOR LIGHT SENSOR WITH INTEGRAL CHARGE COLLECTION, filed May 7, 1999, by Jon H. Bechtel et al., the disclosures of which are incorporated herein by reference.

The microcontroller 70 is configured to receive a speed signal corresponding to a speed of the vehicle 20 via a speed input 78 from the speed sensor 16. In some implementations the microcontroller 70 may be in communication with and receive signals communicating the speed of the vehicle 20 via a vehicle bus 80. The microcontroller 70 may utilize the speed of the vehicle 20 to determine a light level of the headlights 42. The vehicle bus 80 may be implemented using any suitable standard communication bus, such as a Controller Area Network (CAN) bus. In implementations utilizing the vehicle bus 80, the microcontroller 70 may include a bus controller or a control interface may be provided by additional components on the main circuit 62.

The speed input 78 is configured to communicate signals providing the speed of the vehicle 20 to the microcontroller 70. The speed of the vehicle 20 may be used by the microcontroller 70 to compare to vehicle speed criteria, which may be utilized as a factor for determining a control state for the headlights 42. The headlights 42 are configured to output a plurality of light levels. The light levels of the headlights 42 in this example include a first level 82 (e.g. a high level) and a second level 84 (e.g. a low level). By outputting control signals to the headlights 42, the microcontroller 70 is configured to control the light level of the headlights 42 by outputting control signals to the headlamp drive 74 in response to an external light source being detected by the optical sensor and the speed of the vehicle 20. The light levels of the light source 18 (e.g. the headlights 42) referred to herein may refer to an intensity of the light projected from the headlights 42 and/or an elevational level of the light projected from the headlights 42.

The system 10 is selectively activated to control the light level of the headlights 42 by an auto on/off switch via the auto on/off input 86 in communication with the microcontroller 70. The on/off input 86 is configured to communicate an input to selectively activate the system 10 in response to an operator preference. In some situations, an operator may prefer to manually adjust the headlights. In a manual configuration, the level of the headlights 42 is controlled by a manual dimmer switch and communicated to the microcontroller 70 via the manual dimmer switch input 87. The on/off input 86 may be incorporated to provide flexibility to ensure that the light level of the headlights 42 is fully controllable based on a preference of the operator of the vehicle 20.

The main circuit 62 may further be in communication with additional vehicle systems and may be configured to receive signals communicating information corresponding to these vehicle systems via optional inputs. A reverse signal input 88 is operable to communicate to the microcontroller 70 that the vehicle 20 is in a reverse condition. The reverse condition communicated by the reverse signal input 88 may be implemented to adjust the light level of the headlights 42 and also may signal to the microcontroller 70 to adjust a reflective setting of the EC mirror element 76. The system 10 introduced herein is configured to implement various control schemes for the vehicle 20, some of which are discussed in the methods introduced in reference to FIGS. 3 and 4.

Figure 3:
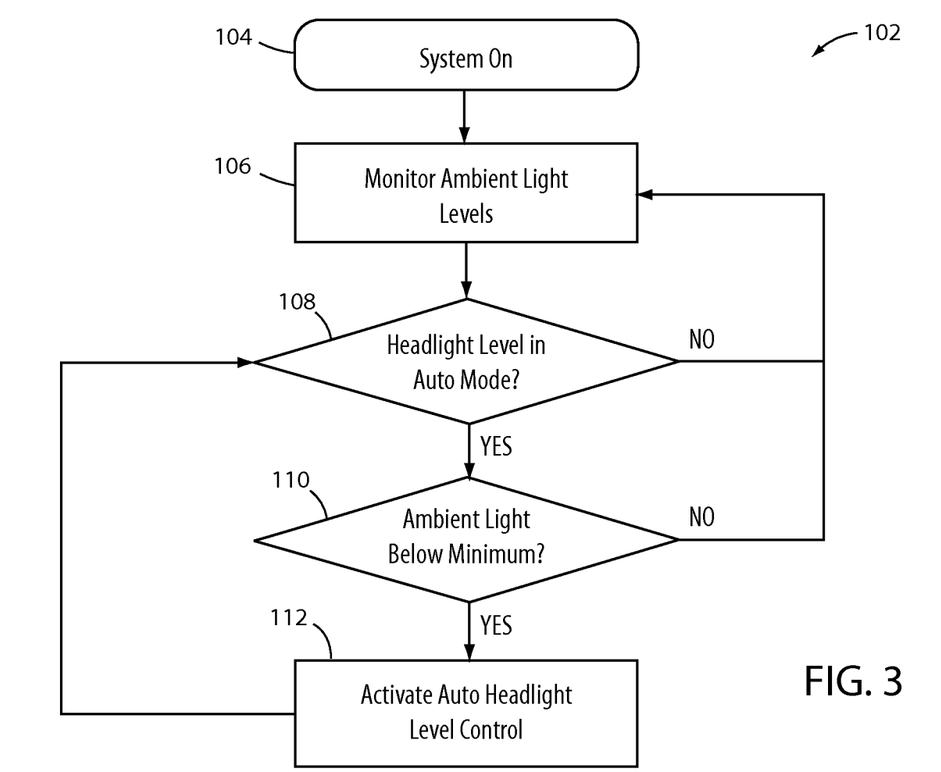
FIG. 3 is a flowchart of a method for activating a control state of the headlight level control system.

Referring to FIG. 3, a flowchart of a method 102 for activating a control state of the system 10 is shown. As discussed previously, the automatic headlight level control system is activated 104 either manually by the auto on/off switch or may be activated 104 initially when the vehicle 20 is started. The method 102 begins with by the microcontroller 70 monitoring ambient light levels with the ambient light sensor 64 to determine if the ambient light level is low enough to trigger the headlights 42 of the vehicle 20 to be activated (106). Based on the determined ambient light levels, the microcontroller 70 continues to determine if the ambient light level is below a minimum threshold required to activate the headlights 42 (108).

If the ambient light is determined to be below a minimum threshold, the headlights 42 are activated (110). If the ambient light level is determined to be above the minimum threshold, the microcontroller 70 will continue to monitor the ambient light level in step 106. The ambient light level being measured above the minimum threshold is likely the result of sufficient light, for example daylight, notifying the controller 70 that the headlights 42 do not need to be activated (or otherwise activate) in a daytime running light state). Though the headlights are activated in this example in response to an ambient light level, the method 122 introduced in reference to FIG. 4 may be implemented in any exterior lighting system, including a headlight system that activates headlights or any other exterior lighting in response to a manual input.

Once the headlights 42 are activated, the microcontroller 70 may control the level of the headlights 42 automatically (112). The microcontroller 70 may also continue to determine if the headlight level adjustment is in automatic mode (108). The microcontroller 70 may determine if the headlight level adjustment is in automatic mode and the status of other settings by accessing a memory or a plurality of registers configured to store information related to the settings of the various modules of the system 10. If the headlight level adjustment is in automatic mode, the microcontroller 70 will continue to monitor the ambient light as in step 110 in order to control the level of the headlights automatically in step 112. If the headlight level control is not in automatic, the method returns step 106 to monitor the ambient light levels to deactivate the headlights upon a detection of an increased ambient light level.

Figure 4:
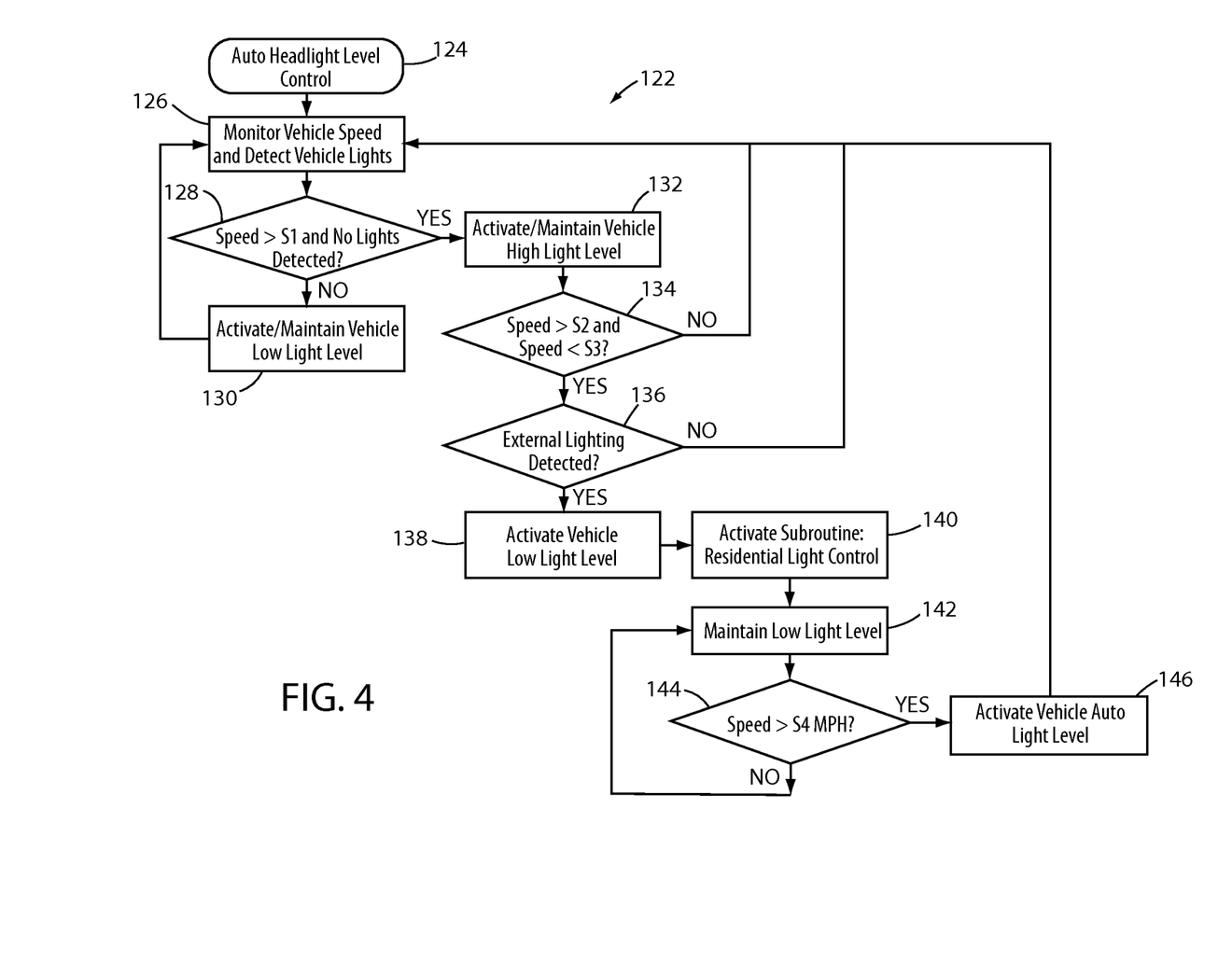
FIG. 4 is a flow chart of a method for a control state of the headlight level control system having a residential control of the headlights.

FIG. 4 is a flow chart of a method 122 for an automatic headlight level control system having a residential control mode. The method 122 corresponds to the microcontroller 70 controlling the headlights 42 for automatic headlight level control similar to the headlight control discussed in reference to step 112 (124). When operating to control the automatic headlight level, the microcontroller 70 determines the speed of the vehicle 20 from the speed input 78 and detects lights corresponding to other vehicles by processing image data from optical sensor 12 (126). Additional steps and detailed processing steps may be required to process the image data to detect lights corresponding to other vehicles. Processes that may be implemented to process the image data and detect lights from other vehicles may be found in the following references which are included herein by reference in their entirety: U.S. Pat. No. 6,728,393, entitled VEHICLE LAMP CONTROL, filed by Joseph S. Stam on Dec. 19, 2002; U.S. Pat. No. 8,120,652, entitled SYSTEM FOR CONTROLLING VEHICLE EQUIPMENT, filed by Jon H. Bechtel on Sep. 16, 2008; and U.S. Pat. No. 8,543,254, entitled VEHICULAR IMAGING SYSTEM AND METHOD FOR DETERMINING ROADWAY WIDTH, filed by Jeremy A. Schut on Mar. 28, 2012. The microcontroller 70 is operable to identify the lights of other vehicles, streetlights, ambient lighting conditions and other conditions that may be monitored to alter the light level of the headlights 42. These controls which are outlined in detail in the above referenced documents may be undertaken by the microcontroller 70 and other similar systems and methods in addition and in combination with the method 122.

In combination with the control methods referenced above, the microcontroller 70 monitors the speed of the vehicle to determine if the speed is greater than speed S1 (128). If the speed of the vehicle does not exceed S1, the microcontroller 70 maintains the light level of the headlights (130). The microcontroller 70 then returns to step 126 to monitor the speed of the vehicle 20. If the microcontroller 70 detects that the speed of the vehicle 20 has exceeded speed S1, the microcontroller 70 controls the headlamp drive 74 to adjust the headlights 42 of the vehicle 20 to the first level 82 corresponding to the high level (132).

Once the headlights are adjusted to the first level 82 in step 132, the microcontroller 70 continues to monitor the speed to determine if the vehicle speed is greater than a speed S2 or less than a speed S3 (134). If the speed of the vehicle is determined to be greater than the speed S3 or less than the speed S2, the microcontroller 70 proceeds to step 126. If the vehicle speed remains between the speeds S2 and S3, the microcontroller 70 will monitor and process the images from the optical sensor 12 to determine if external lighting is detected (136). The external lighting may correspond to lighting that appears similar to that of vehicles other than the vehicle 20.

In some examples, the lighting may originate from a residence or business that is captured in the field of view 44 of the optical sensor 12. In some cases the external light source 26 may be detected approximately central to the field of view 44 of the optical sensor 12. In some cases, the external light source may appear anywhere in the field of view 44. The light source may correspond to any light source including light sources having a very high frequency flicker similar to an alternating current (AC) light source or no reasonably detectable flicker that may be similar to a direct current (DC) light source.

If an external light source is not detected in step 136 the microcontroller may continue to step 126 to monitor the vehicle speed. If an external light source is detected, for example a residential light source, the microprocessor activates the second level 84 of the headlights 42 corresponding to the low level 142 (138). The microcontroller 70 further activates a subroutine, for example a residential light control routine, configured to limit intermittent fluctuations in a level of the headlights 42 while the vehicle 20 is operating in residential areas (140). When operating in the subroutine, the microcontroller 70 maintains the headlights at the second level 84 corresponding to the low level (142). The microcontroller 70 also continues to monitor whether the speed of the vehicle 20 exceeds the speed S4 (144).

In step 144, if the speed of the vehicle 20 does not exceed S4, the microcontroller 70 will return to step 106 to continue to control the headlamp drive 74 to maintain the headlights at the second level 84 corresponding to the low level. If the speed of the vehicle 20 exceeds the speed S4, then the microcontroller will reactivate the auto light level (146). The microcontroller 70 then continues to step 126 to monitor the speed of the vehicle 20.

The method 122 provides for a light level control that not only is configured to control a light level of an exterior vehicle light in response to an external light detection, but further provides for various novel methods to ensure that a change in a light level does not distract an operator of the vehicle 20 equipped with the system 10. The methods and systems are operable to identify conditions when exterior light sources do not likely originate from other vehicles to limit intermittent and distracting light level changes of the exterior vehicle light. The methods and systems discussed herein provide for improved reliability and accuracy in automatic headlight level control which will further improve the comfort and safety of passenger of vehicles implementing such methods and systems.

The speeds S1, S2, S3, and S4 as discussed herein may refer to speeds that correspond to residential driving speeds. In some implementations, the speeds S1-S4 correspond to speeds between 5 mph and 45 mph. In some implementations, the speeds S1-S4 correspond to speeds between 15 mph and 35 mph. In some implementations each of the speeds may correspond to an approximate speed within a range of plus or minus 5 or 10 mph as follows: S1≈25 mph, S2≈21 mph, S3≈29 mph, and S4≈29 mph.

In some implementations, the speeds S1-S4 may further be related as follows: S2<S1<S3≤S4. The speeds S1-S4 may generally refer to speeds that may be adjusted based on various speed zones that may be based on geographic locations where the vehicle 20 may be operated including residential zones in various locations. The various speeds as discussed herein are applied in combination with a detection of a light source which may correspond to a residential light source or any light source that may be stable having a very high frequency flicker or no flicker to provide for an automatic headlight level control system that limits distractions to vehicle operators in the form of intermittent headlight level adjustments.

The methods and systems described above may be implemented in many different ways in many different combinations of hardware, software or both hardware and software. For example, all or parts of the microcontroller of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium.

The processing capability of the system or device may be distributed among multiple system components, such as among multiple controllers, modules, processors and memories, optionally including multiple distributed processing systems. Parameters, tables, and other data structures may be separately stored and managed, may be incorporated into a single memory, may be logically and physically organized in many different ways, and may implemented in many ways, including data structures such as linked lists, hash tables, or implicit storage mechanisms. Routines may implemented in parts (e.g., subroutines) of a routine, separate programs, distributed across several memories and processors, or implemented in many different ways, for example, the microcontroller may store code that performs any of the system processing described above.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The nature of the exclusive rights of the various implementations set forth herein are defined solely by the appended claims including any amendments made during the pendency of this application and all equivalents of those claims as issued.

What is claimed is:

1. An automatic vehicle exterior light control system, comprising:
   an optical sensor;
   a processor in communication with the optical sensor and a speed sensor, the processor being configured to generate a plurality of control signals configured to control a lighting level of at least one light source as a function of a speed signal received from the speed sensor, wherein the processor is operable to:
   detect a vehicle speed from the speed signal;
   generate a first control signal configured to activate a first level of the light source;
   generate a second control signal configured to activate a light control subroutine in response to:
      the vehicle speed being maintained between a first speed and a second speed; and
      a detection of an external light from an external light source detected by the optical sensor; and
   wherein the light control subroutine comprises changing the light level from the first level to a second light level of the light source and maintaining the second light level until the processor detects the vehicle speed exceeding a third speed, wherein light is emitted from the at least one source in each of the first level and the second level.

2. The light control system according to claim 1, wherein the first level of the light source is higher than the second light level.

3. The light control system according to claim 1, wherein the first control signal is configured to activate the first level in response to the vehicle speed exceeding a fourth speed.

4. The light control system according to claim 3, wherein the fourth speed is between the first speed and the second speed.

5. The light control system according to claim 1, wherein the external light is substantially stable and produces little to no detectable flicker.

6. The light control system according to claim 1, wherein the light source comprises at least one headlight of the vehicle.

7. A method for controlling a level of an exterior light source of a vehicle operable to output at least a low level and a high level of light output utilizing an optical sensor and a speed sensor in communication with a processor, the method comprising:
   monitoring a vehicle speed received from the speed sensor;
   outputting a control signal configured to activate the light source at the low level in a subroutine response to:
      detecting an external light source in a field of view of the optical sensor; and
      determining that the vehicle speed is above a first threshold and below a second threshold; and
   maintaining the control signal for the subroutine for the low level of the light output until the vehicle speed exceeds a third threshold.

8. The method according to claim 7, wherein the exceeding of the third threshold results in activating the high level of the light output.

9. The method according to claim 7, wherein the first threshold is less than the second threshold.

10. The method according to claim 9, wherein the third threshold is approximately equal to the second threshold.

11. The method according to claim 7, further comprising outside the subroutine activating the light source to the high level in response to the vehicle speed exceeding a fourth threshold.

12. The method according to claim 11, wherein the fourth threshold corresponds to a speed between the first threshold and the second threshold.

13. The method according to claim 7, further comprising activating the controlling of the level of the exterior light source in response to an ambient light condition being below the minimum ambient light threshold.

14. An apparatus for controlling at least a first level and a second level of a light output of a vehicle, the apparatus comprising:
   an optical sensor;
   a processor in communication with the optical sensor and a speed sensor, the processor being operable to:
   output a first control signal configured to control the level of the headlight in a first subroutine, comprising:
      activating the headlight at the first level in response to the vehicle speed exceeding a first threshold;
      activating the second level in response to detecting an external light source in a field of view of the optical sensor; and change the control signal to a second control signal configured to change from the first subroutine to a second subroutine in response to:
  detecting an external light source in a field of view of the optical sensor; and
  determining that the vehicle speed is above a second threshold and below a third threshold;
wherein the second subroutine comprises maintaining the second level of the light output until the vehicle speed exceeds a fourth threshold.

15. The apparatus according to claim 14, wherein the first level corresponds to a high level and the second level corresponds to a low level relative to the high level.

16. The apparatus according to claim 14, wherein the second threshold is less than the third threshold.

17. The apparatus according to claim 14, wherein and the first threshold greater than the second threshold.

18. The apparatus according to claim 14, wherein the processor is further configured to:
  output the first control signal configured to activate the first subroutine in response to the vehicle speed exceeding the fourth threshold.

19. The apparatus according to claim 14, wherein each of the subroutines are further activated in response to an ambient light level being below the minimum ambient light threshold.

* * * * *

UNITED STATES PATENT AND TRADEMARK OFFICE
CERTIFICATE OF CORRECTION

PATENT NO. : 9,586,516 B2  
APPLICATION NO. : 14/632493  
DATED : March 7, 2017  
INVENTOR(S) : Philip B. Hall

Page 1 of 1

It is certified that error appears in the above-identified patent and that said Letters Patent is hereby corrected as shown below:

In the Claims

Column 10, Claim 1, Line 2:  
After "one" insert --light--.

Signed and Sealed this  
Ninth Day of May, 2017

Michelle K. Lee  
*Director of the United States Patent and Trademark Office*